United States Patent
Tsai

(10) Patent No.: US 7,918,998 B2
(45) Date of Patent: Apr. 5, 2011

(54) WATER TREATMENT APPARATUS WITH EASY FILTER REPLACEMENT CONSTRUCTION

(76) Inventor: Chih-Hao Tsai, Daya Township, Taichung County (TW)

( * ) Notice: Subject to any disclaimer, the term of this patent is extended or adjusted under 35 U.S.C. 154(b) by 164 days.

(21) Appl. No.: 12/453,072

(22) Filed: Apr. 29, 2009

(65) Prior Publication Data
US 2009/0289003 A1  Nov. 26, 2009

(30) Foreign Application Priority Data
May 20, 2008 (TW) .................. 97133637 A

(51) Int. Cl.
*B01D 27/08* (2006.01)
*B01D 35/30* (2006.01)
(52) U.S. Cl. .................. 210/232; 210/335; 210/444
(58) Field of Classification Search .................. 210/232, 210/335, 444
See application file for complete search history.

(56) References Cited

U.S. PATENT DOCUMENTS
6,740,235 B2 * 5/2004 Gill .................. 210/238
6,800,199 B1 * 10/2004 Rhee .................. 210/232
7,438,811 B2  10/2008 Lin FOREIGN PATENT DOCUMENTS
WO  WO 2004041409 A1 * 5/2004
* cited by examiner

*Primary Examiner* — Thomas M Lithgow
(74) *Attorney, Agent, or Firm* — Rosenberg, Klein & Lee

(57) ABSTRACT

A water treatment apparatus includes a frame and a plurality of connecting accessories, manifolds and filter cartridges. Each of the connecting accessories includes a seat ring fixed on the frame and a communicating pipe coaxially received in the seat ring. The seat rings together with the communicating pipes are spaced at a distance from one another. Each of the manifolds is suspended between adjacent two of the connecting accessories and has inlet and outlet ports at opposite ends. The inlet and outlet ports of each of the manifolds are rotatably and coaxially received in adjacent the seat rings respectively with their exterior walls in contact with inner walls of adjacent the seat rings and their interior walls in contact with outer walls of adjacent the communicating pipes. Additionally, the filter cartridges are detachably joined to the manifolds respectively.

9 Claims, 7 Drawing Sheets

WATER TREATMENT APPARATUS WITH EASY FILTER REPLACEMENT CONSTRUCTION

BACKGROUND OF INVENTION

1. Field of Invention

This invention relates to water purification and filtration system, such as a reverse osmosis purification system, and more particularly to water treatment apparatus which is constructed to permit easy filter replacement.

2. Related Prior Art

U.S. Pat. No. 7,438,811 is exemplary of patent directed to water purification apparatus of the type to which this invention is directed. As shown in FIGS. 1-3 presented in that patent, the water purification apparatus includes a main body 92 having an accommodation chamber 922 inside, a plate 94 on a top side thereof, a lid 96 pivotally mounted on the main body 92 and closable on the main body 92, at least one holder 20 fixed on the plate 94 and defining with the plate 94 a distance, a top cover 30 pivotally mounted on the holder 20, and a housing 40 detachably engaged with the top cover 30. More specifically, each of the holders 20 has a connecting portion 23, two dangling portions 21 on a top side of the connecting portion 23 and a pair of water-guiding portions 22 extending from two sides of the connecting portion 23. The dangling portions 21 are fixed on the plate 94 of the main body 92. On the other hand, the top cover 30 has an inlet 34 on a top section thereof and an outlet 36 on the opposite side of the inlet 34. The water-guiding portion 22 of the holder 20 has two distal ends each being inserted into the inlet 34 and the outlet 36 of the top cover 30 such that the top cover 30 is pivotable about the axis of the water-guiding portions 22 of the holder 20. Further, O-rings 221 of the holder 20 fixed on the water-guiding portion 22 are in contact with an inner periphery of the inlet 34 or the outlet 36 of the top cover 30 such that water is stopped by the O-rings 221 of the holder 20. The water purification apparatus has the advantages of being convenient to exchange a filter or filter cartridge.

However, the O-rings 221 of the holder 20 easily become deformed time after time since the water-guiding portions 22 are burdened with the filter assembly 50, and the filter assembly 50 pivots on the water-guiding portions 22. In the course of time, the rotation of the filter assembly 50 will wear the O-rings 221 away and make breaches between the top cover 30 and the water-guiding portions 22, which cause leakage of water.

SUMMARY OF INVENTION

Broadly stated, the present invention is directed to a water treatment apparatus for easy filter exchange work. The water treatment apparatus comprises a frame and a plurality of connecting accessories, manifolds and filter cartridges. Each of the connecting accessories includes a seat ring fixed on the frame and a communicating pipe coaxially received in the seat ring. The seat rings together with the communicating pipes are spaced at a distance from one another. Each of the filter cartridges is detachably joined to the respective manifold. Each of the manifolds is suspended between adjacent two of the connecting accessories and has inlet and outlet ports at opposite ends. The inlet and outlet ports of each of the manifolds are rotatably and coaxially received in adjacent the seat rings and mounted around adjacent the communicating pipes as well. In this way, exterior walls of the inlet and outlet ports are in contact with inner walls of the adjacent seat rings while interior walls of the inlet and outlet ports are in contact with outer walls of the adjacent communicating pipes so as to strength the rotary connection between the manifold and the adjacent connecting accessories. Since relatively less weight from the filter cartridges stresses the communicating pipe with compared with the prior art, the O-rings sandwiched between the communicating pipe and the inlet or outlet ports won't be wear out easily and thereby the water treatment apparatus can have longer lifespan without leakage of water.

The advantages of the present invention will be understood more readily after a consideration of the drawings and the Detailed Description.

BRIEF DESCRIPTION OF DRAWINGS

The invention is illustrated by the accompanying drawings in which corresponding parts are identified by the same numerals and in which.

DETAILED DESCRIPTION OF EMBODIMENTS

Figure 1:
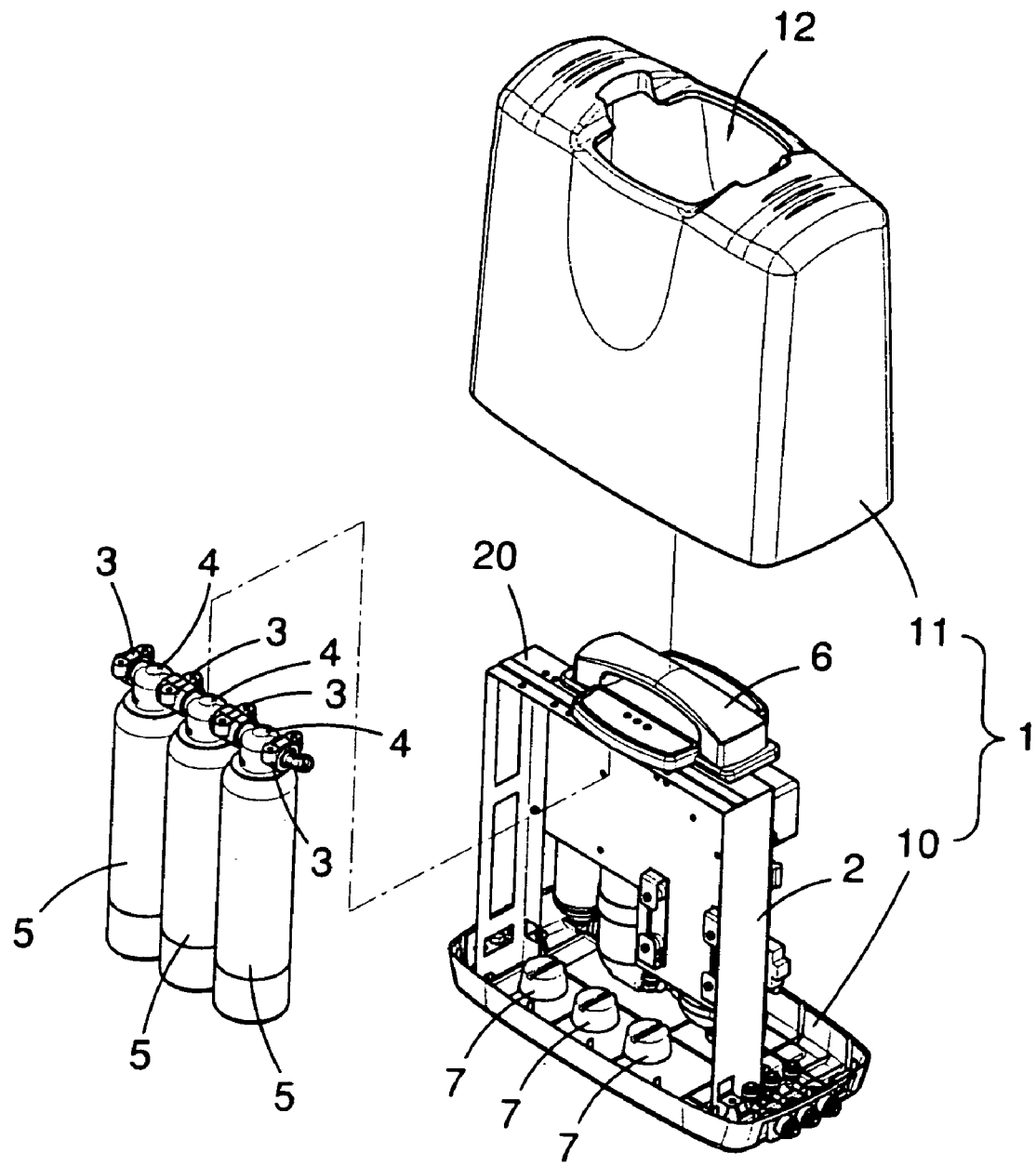
FIG. 1 is an exploded view of a water treatment apparatus in accordance with a first embodiment of the invention.

With attention to FIG. 1, an exploded assembly drawing is shown to a water treatment apparatus in accordance with a first embodiment of the invention. The water treatment apparatus includes a casing 1, a frame 2, a plurality of connecting accessories 3, a plurality of manifolds 4, a plurality of filter cartridges 5 and a handle 6.

Figure 2:
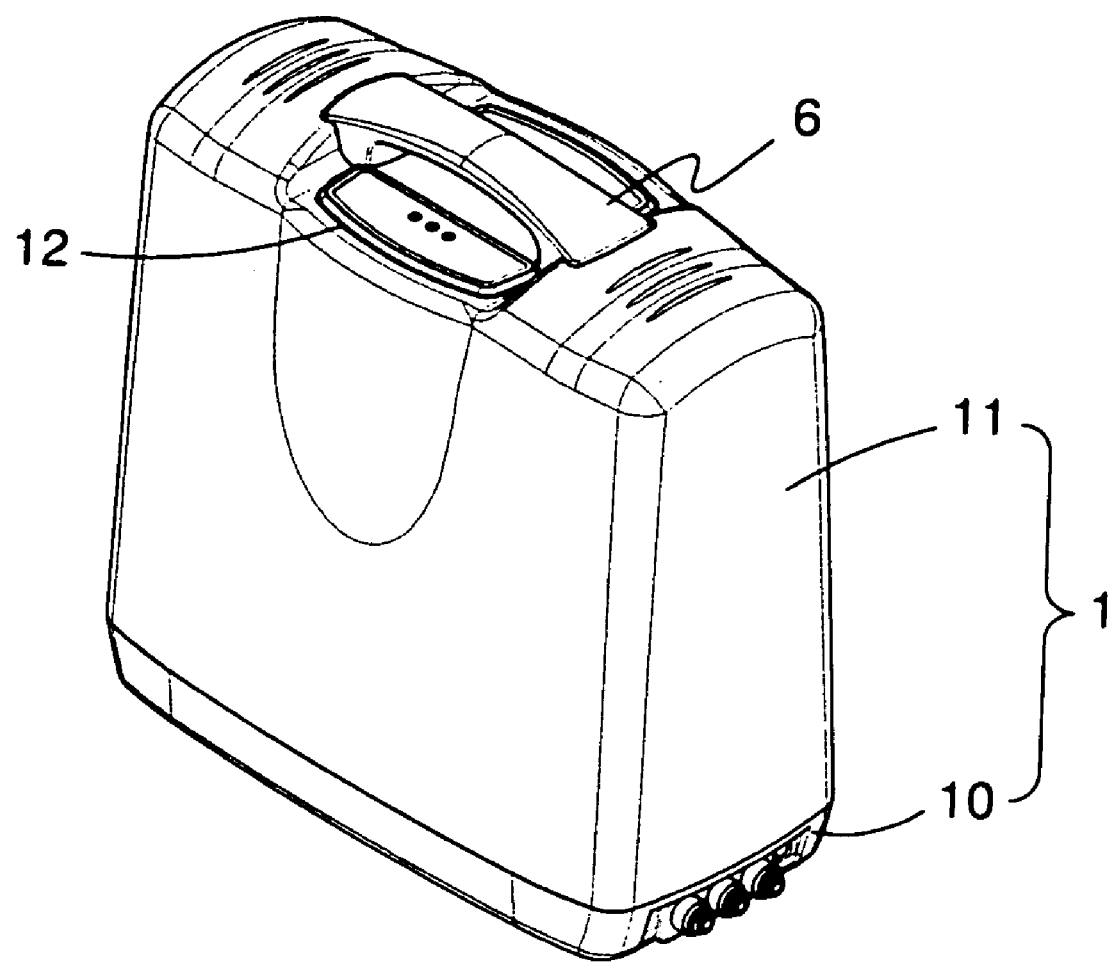
FIG. 2 is an assembled perspective view of the water treatment apparatus shown in FIG. 1.

The casing 1 is composed of a base 10 and a cover 11. The cover 11 is detachably mounted on top of the base 10 and defines an opening 12 in a top thereof. The frame 2 is made of metal, such as stainless, and is fixed on top of the base 10 as well. The connecting accessories 3 are secured on a bottom of a top plate 20 of the frame 2 and spaced at a distance from one another. Each of the manifolds 4 is suspended between adjacent two of the connecting accessories 3. The filter cartridges 5 are detachably joined to the manifolds 4. The handle 6, for easy carry, is mounted on a top plate 20 of the frame 2, extends through the opening 12 of the cover 11 and is exposed outside of the cover 11, as shown in FIG. 2.

Figure 3:
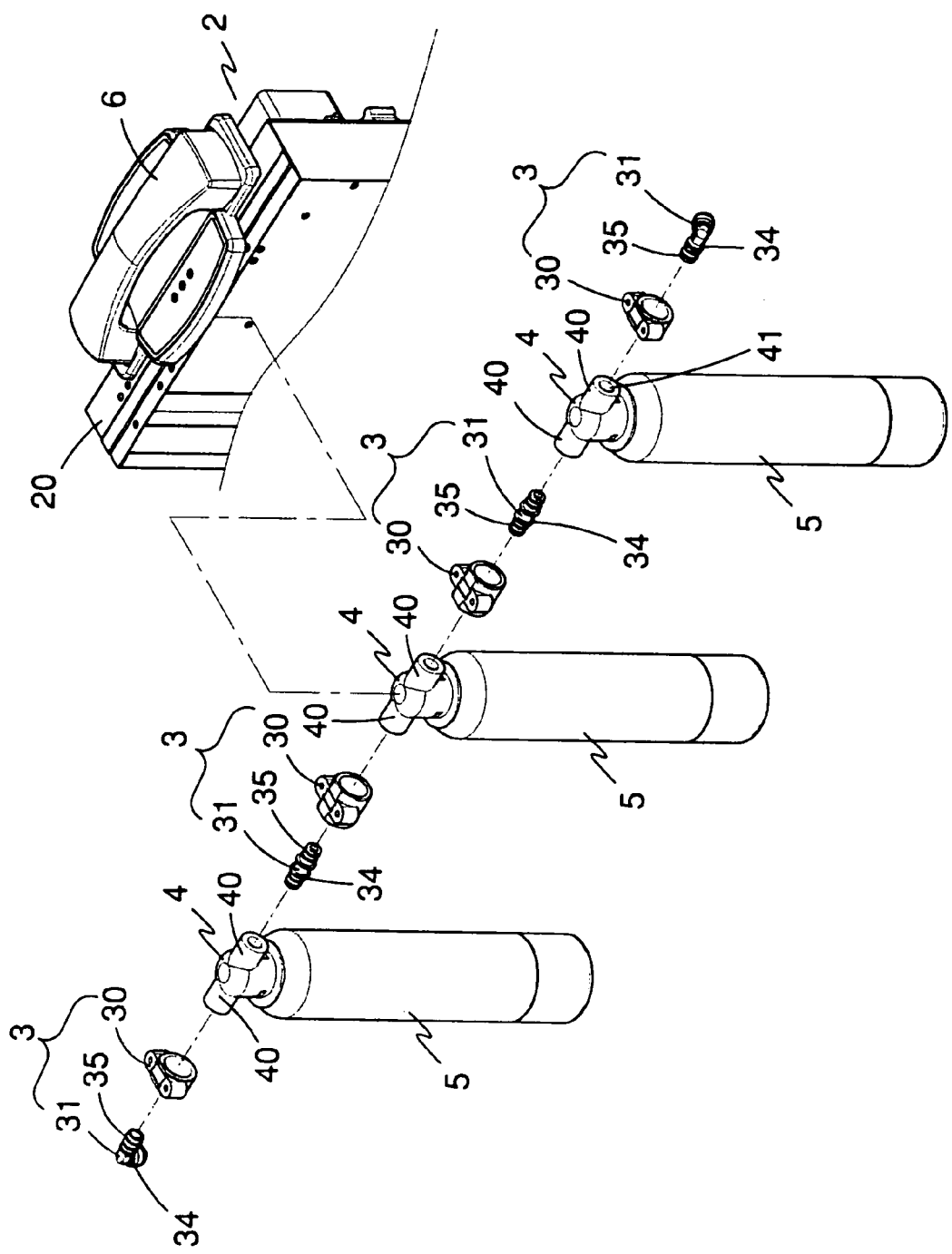
FIG. 3 is a fragmentary, enlarged exploded perspective view of the water treatment apparatus of FIG. 1.
Figure 4:
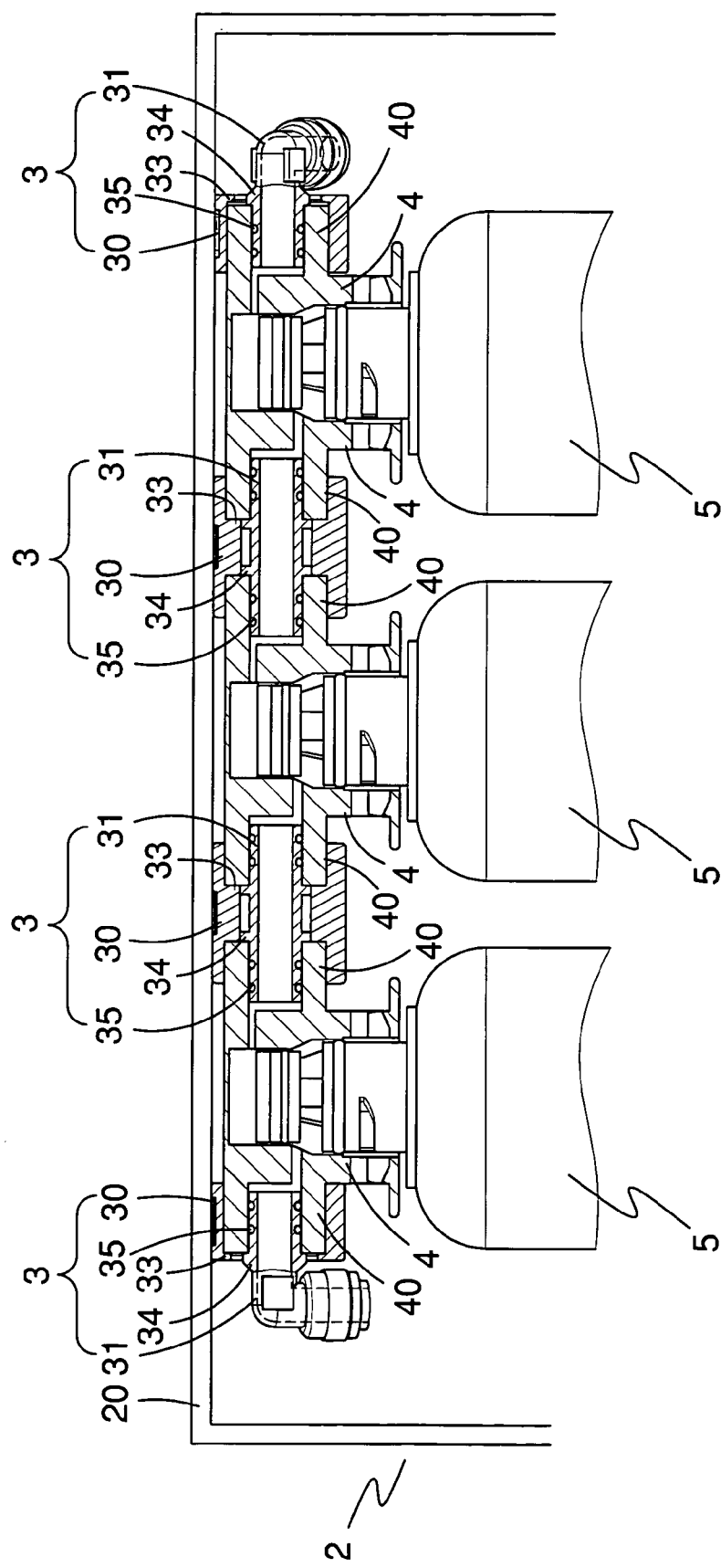
FIG. 4 is a cross section of the water treatment apparatus of FIG. 1 taken along its longitudinal direction.

Referring to FIGS. 3 and 4, each of the connecting accessories 3 includes a seat ring 30, a communicating pipe 31 coaxially received in the seat ring 30 and a plurality of O-rings 35 mounted around an outer wall of the communicating pipe 31. The seat rings 30 of the connecting accessories 3 are fixed on the top plate 20 of the frame 2 and spaced at a distance from one another. Further, as shown in FIG. 4, each of the seat rings 30 is formed with an inward protrusion 33 on an inner wall thereof. Each of the communicating pipes 31 is formed with a confining portion 34 on the outer wall thereof.

Furthermore, each of the manifolds 4 has inlet and outlet ports 40 at opposite ends. The inlet and outlet ports 40 of each of the manifolds 4 are rotatably and coaxially received in the adjacent seat rings 30 and are mounted around the adjacent communicating pipes 31. As best seen in FIG. 4, exterior walls of the inlet and outlet ports 40 are in contact with inner walls of adjacent the seat rings 30 while interior walls of the inlet and outlet ports 40 are in contact with the outer walls of adjacent the communicating pipes 31. Additionally, the inlet and outlet ports 40 of each of the manifolds 4 are confined between adjacent two of the confining portions 34 of the communicating pipes 31 so that the manifold 4 can stand in proper position. The O-rings 35 are also mounted around the communicating pipes 31 and are tightly received in the inlet and outlet ports of the adjacent manifolds 4 so that a leak of water is stopped. Different from the prior art, the seat rings 30 which enclose the inlet and outlet ports 40 of the adjacent manifolds share with the communicating pipes 31 the heavy burdens of the manifolds 4, the filter cartridges 5 and water stored in the filter cartridges 5, especially when the filter cartridges are swiveled. Hence the communicating pipes 31 carry relative less burden when compared with the prior art, and thereby the O-rings 35 are protected from being easily worn out or deformed with time.

Referring again to FIG. 4, the middle seat rings 30, situated in the intermediate zone of the water treatment apparatus, have their inward protrusions 33 formed in the middle sections thereof. For those situated in the end zone, the two end seat rings 30 have their inward protrusions 33 formed in the end sections thereof. Additionally, each of the inward protrusions 33 of the seat rings 30 is flushed with the respective confining portion 34 of the communicating pipe 31.

Figure 5:
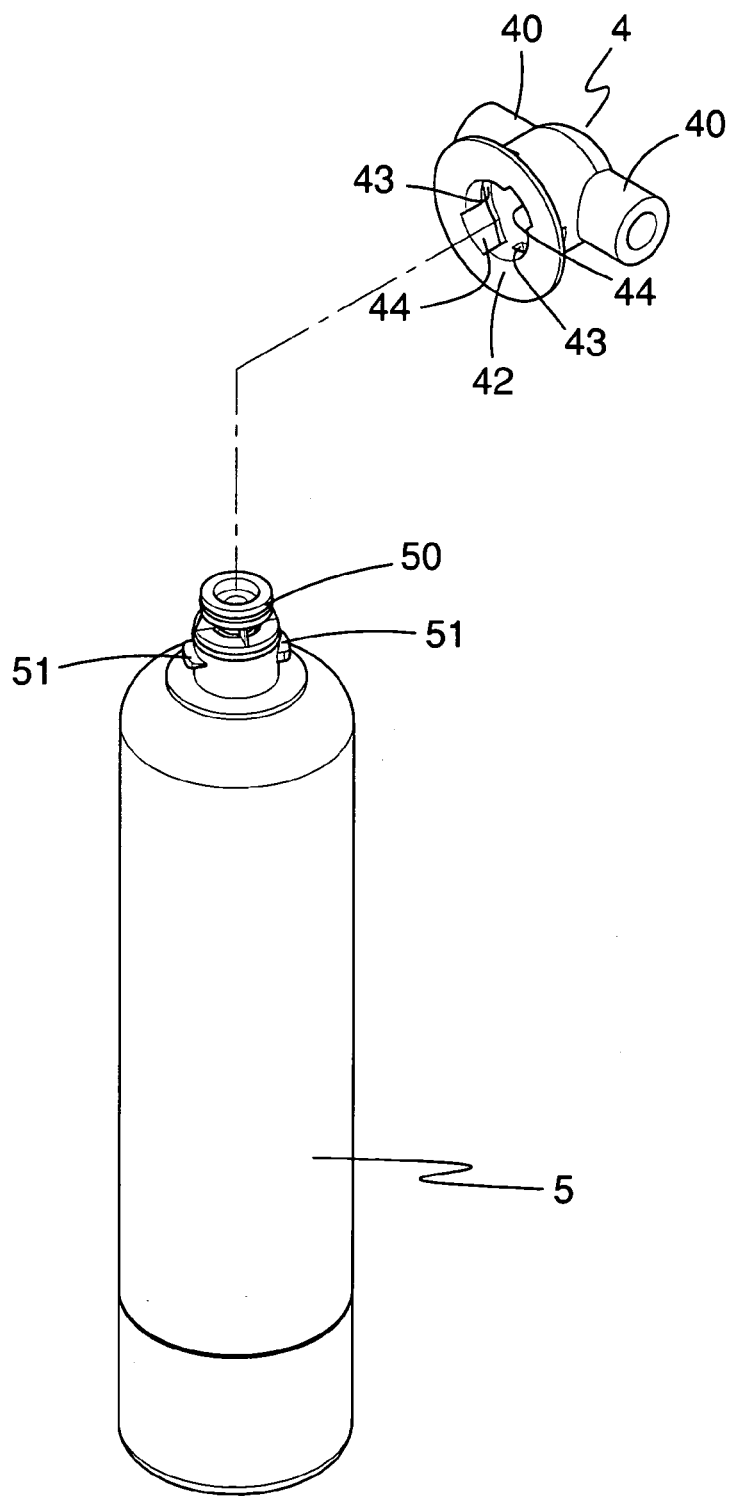
FIG. 5 is a perspective view of a part of the water treatment apparatus of FIG. 1, showing that the manifold is disengaged with the filter cartridge.

Referring to FIG. 5, each of the manifolds 4 further has a connecting port 42 in communication with the inlet and outlet ports 40. Each of the connecting ports 42 defines a pair of opposed inward recesses 44 and a pair of lateral limiting slots 43. The opposed inward recesses 44 are defined in an inner wall of the connecting port 42 and extend along the length of the connecting port 42. The lateral limiting slots 43 are defined in a peripheral wall of the connecting port 42 and are in communication with the inward recesses 44.

Each of the filter cartridges 5, a cartridge with filter medium therein, has a protruding tube 50 in communication with the inside of the filter cartridge 5. The protruding tube 50 is generally dimensioned in accordance with the respective connecting port 42 of the manifold 4 so as to be coaxially received in the connecting port 42 and therefore be in communication with the inlet and outlet ports 40 of the manifold 4. Further, the protruding tube 50 is formed with a pair of shoulder flanges 51 at opposite sides corresponding to the inward recesses 44 of the connecting port 42. In such a fashion, the protruding tube 50 can be guided into the inward recesses 44 of the connecting port 42 and then be rotated into the lateral limiting slots 43 by rotation of the filter cartridge 5. Upon rotation, the protruding tube 50 will be lodged in the lateral limiting slots 43 of the connecting port 42 so as to lock the filter cartridge 5 on the manifold 4.

Figure 6:
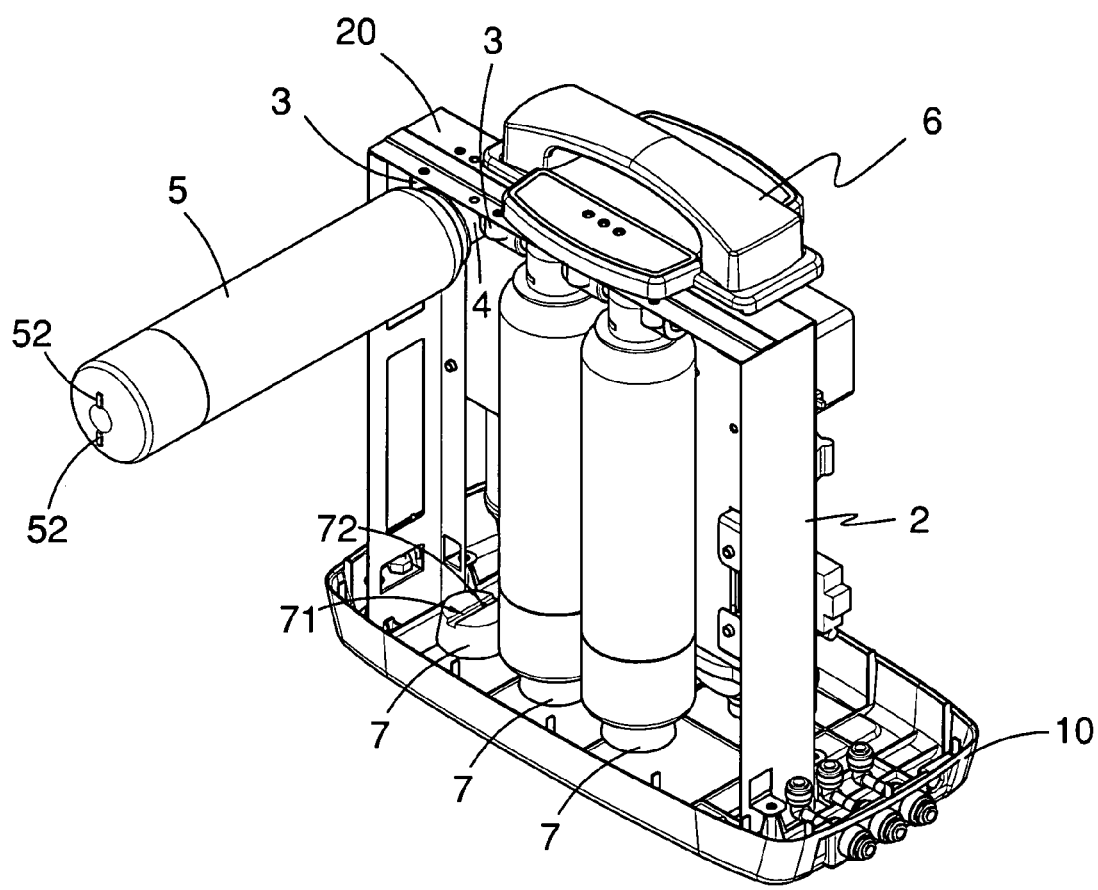
FIG. 6 is a partial assembled perspective view of the water treatment apparatus shown in FIG. 1, showing that the filter cartridge is to be drawn out for replacement.

FIG. 6 illustrates that the filter cartridge 5 is swingable for filter replacement as a result of the manifold 4 being rotatably mounted between the adjacent two connecting accessories 3. Thus, when the filter cartridge 5 is swung outward to the outside of the frame 2, the filter cartridge 5 is allowed to be rotated in a reverse direction to be disengaged with the manifold 4, as depicted in FIG. 5, for further filter replacement.

Moreover, the base 10 of the casing 1 is formed with a plurality of rotation-proof members 7 thereon to be engaged with bottoms of the filter cartridges 5. Specifically, each of the rotation-proof members 7 has a straight depression 71 defined therein. Each of the filter cartridges 5 is formed with one or more straight protrusions 52 in a line thereon corresponding to the straight depression 71 of the rotation-proof member 7. When the filter cartridge 5 is seated in the rotation-proof member 7, the filter cartridge 5 is restrained from rotation due to the straight protrusions 52 of the filter cartridges 5 being lodged in the straight depression 71 of the rotation-proof member 7 of the base 10. In this way, the filter cartridges 5, suffered from the water pump shock while in use, are still firmly seated in the rotation-proof member 7 of the base 2 and protected from being inversely released from the manifold 4. Preferably, each of the rotation-proof members 7 is formed with a bump 72 within the straight depression 71. Each of the filter cartridges 5 is formed of two straight protrusions 52 in a line and is spaced at a distance from the other so that when the filter cartridge 5 is seated in the rotation-proof member 7, the bump 72 of the rotation-proof member 7 is confined in between the two straight protrusions 52 of the filter cartridge 5 so as to prevent the filter cartridge 5 from linear movement.

Figure 7:
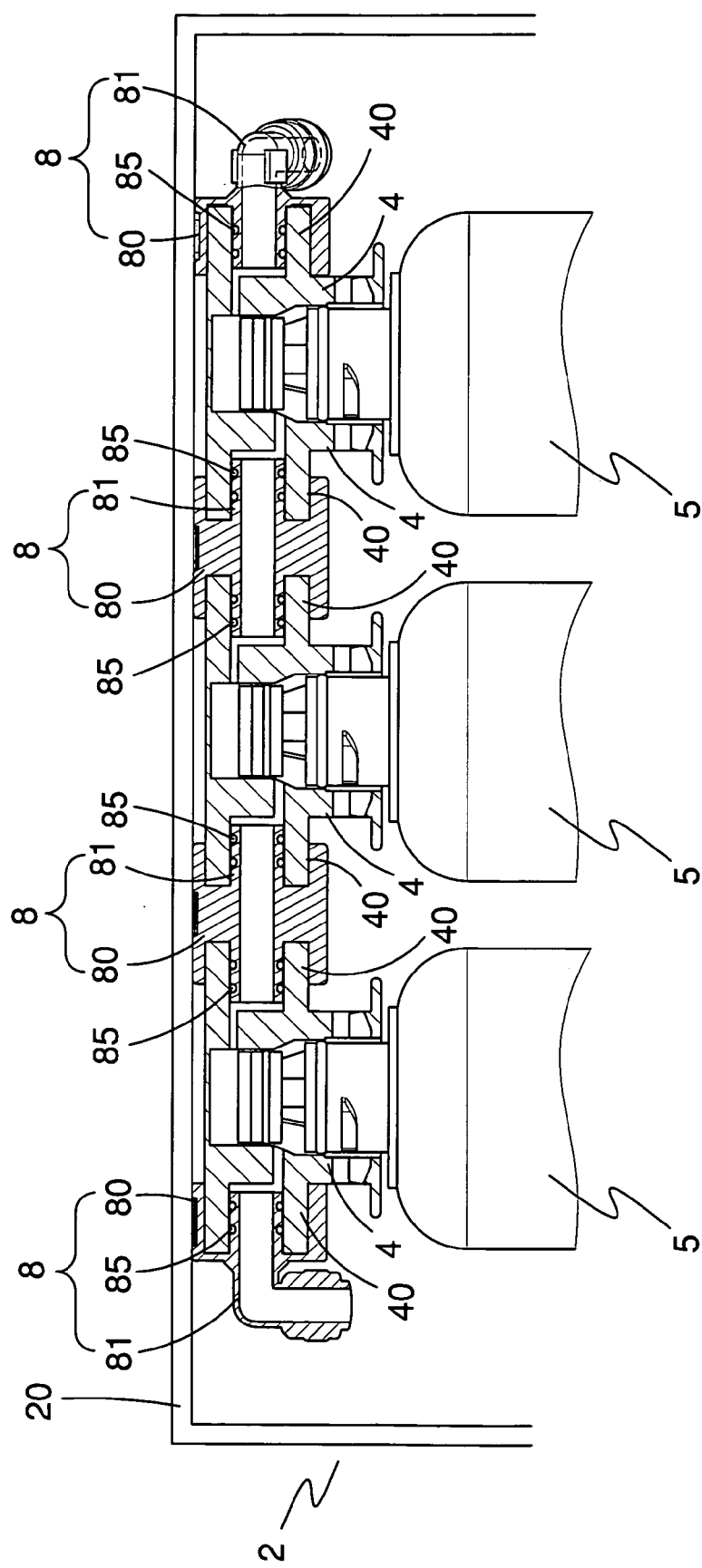
FIG. 7 is a cross section of a water treatment apparatus in accordance with a second embodiment of the invention.

FIG. 7 provides a cross-sectional view of a water treatment apparatus in a second embodiment. Substantially all of the precepts discussed in the first embodiment apply to the second embodiment. The communicating pipe 81 of the connecting accessory 8 have both ends received in the adjacent inlet and outlet ports 40 with the O-rings 85 sandwiched therebetween. The inlet and outlet ports 40 of each of the manifolds 4 are rotatable with respect to the adjacent communicating pipes 31. The major difference is that the seat ring 80 of each of the connecting accessories 8 is formed integrally with the communicating pipe 81.

It will be appreciated that although a particular embodiment of the invention has been shown and described, modifications may be made. It is intended in the claims to cover such modifications which come within the spirit and scope of the invention.

The invention claimed is:

1. A water treatment apparatus comprising:
a frame;
a plurality of connecting accessories each including a seat ring fixed on said frame and a communicating pipe coaxially received in said seat ring; said seat rings together with said communicating pipes being spaced at a distance from one another;
a plurality of manifolds each suspended between adjacent two of said connecting accessories; each said manifold having inlet and outlet ports at opposite ends, said inlet and outlet ports of each said manifold being rotatably and coaxially received in adjacent said seat rings and mounted around adjacent said communicating pipes in such a way that exterior walls of said inlet and outlet ports are in contact with inner walls of adjacent said seat rings and interior walls of said inlet and outlet ports are in contact with outer walls of adjacent said communicating pipes; and
a plurality of filter cartridges detachably joined to said manifolds.

2. The water treatment apparatus of claim 1, wherein each said connecting accessory further includes a plurality of O-rings mounted around said outer wall of said communicating pipe to be received in said inlet and outlet ports of adjacent said manifolds.

3. The water treatment apparatus of claim 1, wherein each said communicating pipe is formed with a confining portion on said outer wall for limiting a distal end of said inlet or outlet port.

4. The water treatment apparatus of claim 3, wherein each said seat ring is formed with an inward protrusion on said inner wall thereof, and said inward protrusion of said seat ring is flushed with said confining portion of said communicating pipe.

5. The water treatment apparatus of claim 1, wherein
each said manifold further has a connecting port in communication with said inlet and outlet ports, said connecting port defines a pair of opposed inward recesses extending along the length of said connecting port and a pair of lateral limiting slots in a peripheral wall and in communication with said inward recesses; and each said filter cartridge has a protruding tube in communication with the inside of said filter cartridge; said protruding tube is adapted to be coaxially received in said connecting port of said manifold and is formed with a pair of shoulder flanges at opposite sides to be guided into said opposed inward recesses of said connecting port and be lodged in said lateral limiting slots of said connecting port upon rotation.

6. The water treatment apparatus of claim 5 further comprising a base on which said frame is mounted; said base being formed with a plurality of rotation-proof members thereon to be engaged with bottoms of said filter cartridges so that when said filter cartridge is seated in said rotation-proof member, said filter cartridge is restrained from rotation.

7. The water treatment apparatus of claim 1 further comprising a base on which said frame is mounted; said base being formed with a plurality of rotation-proof members thereon to be engaged with bottoms of said filter cartridges so that when said filter cartridge is seated in said rotation-proof member, said filter cartridge is restrained from rotation.

8. The water treatment apparatus of claim 7, wherein said rotation-proof member has a straight depression defined therein while said filter cartridge is formed with a straight protrusion thereon corresponding to said straight depression of said rotation-proof member.

9. The water treatment apparatus of claim 8, wherein said rotation-proof member is formed with a bump within said straight depression and said filter cartridge is formed with another straight protrusion spaced at a distance from the other said straight protrusion so that when said filter cartridge is seated in said rotation-proof member, said bump of said rotation-proof member is confined in between said two straight protrusions of said filter cartridge.

* * * * *